UNITED STATES PATENT OFFICE.

WALTER BRYANT GUY, OF ST. AUGUSTINE, FLORIDA.

COMPOSITION OF MATTER FOR AND METHOD OF SOIL INOCULATION.

1,411,088.     Specification of Letters Patent.     Patented Mar. 28, 1922.

No Drawing.     Application filed May 17, 1921. Serial No. 470,315.

*To all whom it may concern:*

Be it known that I, WALTER B. GUY, a citizen of the United States, and a resident of St. Augustine, in the county of St. Johns and State of Florida, have invented a new and Improved Composition of Matter for and Method of Soil Inoculation, of which the following is a full, clear, and exact description.

This invention relates to a method of soil inoculation and to a composition of matter for effecting the same.

It has for an object the provision of a simple, efficient process whereby the growth of vegetable and plant life is greatly enhanced by the application of this fertilizing composition thereto.

Another object resides in the provision of a simple, economically manufactured fertilizing composition whereby the efficient and increased development of the products of the soil is effected.

A further object is the provision of a simple, economical method of making the fertilizing composition whereby it is easily obtained in large quantities in the required strength and can be efficiently stored away for any period of time awaiting use.

It is well known at present that carbon dioxide is absolutely necessary for the development of plant life. It is also well known that this gas is taken up by the dews, rain, and water in the soil and absorbed by the roots of vegetable and fruit plants; after which it is decomposed within the plants, the oxygen being liberated and the carbon retained for the nutriment and development of the life of the plants.

In the ordinary use of fertilizers, however, it has been found that it is not feasible to mix fertilizers of any sort directly with the roots or seeds of the plant or vegetable life. I have found, however, by experiment that when the soil in which the plants are grown is inoculated with a plentiful supply of carbon dioxide, in such manner as intimately to mix it in association with the seeds or the roots of the plants, greater plant activity is seen, and the resulting plants are more vigorous and produce fruit more abundantly. It has also been found that where this gas is lacking in soils, then the plant life is stunted and various diseases are prevalent. On the other hand, where there is a plentiful inoculation of the soil by the artificial introduction of a fertilizer containing yeasts, such inoculation will do much to prevent the development of diseases and to enhance the growth and production of the plant life.

The yeast which I have found is most preferable to use is of the genus Saccharomyces, which is the genus of which ordinary yeast is the species. Yeast plants are found in profusion in the air and soil. I prefer to inoculate with these plants a ten per cent solution of sucrose or sucrose and glucose or beer wort, made of malted barley and starch. When the solution is thus inoculated and kept at a temperature of 40° C. for several days, there are produced enormous quantities of the fertilizing bacteria or culture. This culture may then be dried by being dehydrated in a partial vacuum at a low heat to reduce to a powdered form. It is then preferably mixed with a material containing starch and sucrose, and in this state may be kept from deterioration for one or more years.

From various chemical analyses of yeast, it has been found that the following values are representative of the content values of said bacteria: It is found that over 45% of nitrogenous material is present, substantially 4% of mineral matter, of which one-half is phosphoric acid, besides potassium, lime, magnesium, sodium, iron, chlorine and sulphur. It is, therefore readily seen that a fertilizer containing yeast, besides its valuable property of liberating carbon dioxide in relation to the seeds and roots of the plants, contains within itself valuable food properties adapted to the sustenance of plant life.

I have further found, and have developed as a part of my process, that dehydrated yeasts with their food supply can be applied directly to the soil, or may be combined with other substances which stimulate vegetable life, such as guanoes, dry animal manures, tankage, and such substances giving mineral elements necessary to the metabolism of plant life.

I have further found by repeated tests that a culture of yeast, as above prepared, is not injurious to seeds or plants, even when applied directly over or about them, whereas, common manures and artificial fertilizers when put into direct contact with roots or seeds, destroy and injure the plant life. I have found that by so placing the yeasts directly in contact with the roots or seeds, a quicker growth is secured in comparision with other methods.

What I claim is:

1. A composition of matter for soil inoculation, which comprises a fertilizing substance adapted to stimulate vegetable life in combination with yeast.

2. A method of soil inoculation, which comprises intimately associating with the seeds or roots of vegetable life a substance producing carbon dioxide.

3. A method of soil inoculation, which comprises intimately mixing yeast into the soil in association with the seeds and roots of the vegetable life.

4. A method of soil inoculation, which comprises intimately mixing in the soil in association with the seeds and roots of the vegetable life, a bacteriological culture resulting from the mixing of yeast and sucrose.

5. The method of soil inoculation which comprises the formation of yeast culture in dry powdered form, and then intimately mixing said powder with the seeds and roots in the soil.

6. The method of soil inoculation which comprises mixing intimately in the soil a combination of yeast with various fertilizers and soil stimulants.

7. A method of making a fertilizer composition, which comprises inoculating a solution of sucrose with yeast.

8. A method of producing fertilizer, which comprises inoculating a ten per cent solution of sucrose with yeast.

9. A method of making a fertilizer, which comprises inoculating a solution of sucrose with yeast then dehydrating the same at low heat to form a dry powder.

10. A method of making a fertilizer, which comprises inoculating a solution of sucrose with yeast, then dehydrating the same at low heat to form a dry powder, and then mixing said powder with a substance capable of generating carbon dioxide.

WALTER BRYANT GUY.